United States Patent
Moon

(10) Patent No.: US 11,147,349 B2
(45) Date of Patent: Oct. 19, 2021

(54) MOBILE DEVICE CASE WITH DEPLOYABLE PRIVACY SCREENS

(71) Applicant: Sang-Ho Moon, Rego Park, NY (US)

(72) Inventor: Sang-Ho Moon, Rego Park, NY (US)

( * ) Notice: Subject to any disclaimer, the term of this patent is extended or adjusted under 35 U.S.C. 154(b) by 217 days.

(21) Appl. No.: 16/698,787

(22) Filed: Nov. 27, 2019

(65) Prior Publication Data

US 2021/0153616 A1    May 27, 2021

(51) Int. Cl.
| | |
|---|---|
| *A45C 11/00* | (2006.01) |
| *H04B 1/3888* | (2015.01) |
| *G06F 1/16* | (2006.01) |
| *A45F 5/00* | (2006.01) |

(52) U.S. Cl.
CPC ............ *A45C 11/00* (2013.01); *A45F 5/00* (2013.01); *G06F 1/1603* (2013.01); *G06F 1/1626* (2013.01); *H04B 1/3888* (2013.01); *A45C 2011/002* (2013.01); *A45C 2011/003* (2013.01); *G06F 2200/1633* (2013.01)

(58) Field of Classification Search
CPC ..... A45C 5/00; A45C 11/00; A45C 2011/002; A45C 2011/003; G06F 1/1603; G06F 1/1626; G06F 2200/1633; H04B 1/3888
USPC .......................... 206/320; 335/219; 359/601; 361/679.24, 679.55, 679.56; 455/575.1, 455/575.8
See application file for complete search history.

(56) References Cited

U.S. PATENT DOCUMENTS

| | | | |
|---|---|---|---|
| 7,508,657 B1 | 3/2009 | Smith | |
| 10,310,559 B2 | 6/2019 | Holmes | |
| 2009/0268300 A1* | 10/2009 | Dai | G06F 1/1603 |
| | | | 359/601 |
| 2013/0015146 A1 | 1/2013 | Ibeawuchi | |
| 2013/0265644 A1 | 10/2013 | Armstrong | |
| 2014/0375901 A1* | 12/2014 | Stockett | H04N 5/64 |
| | | | 348/838 |
| 2015/0024812 A1* | 1/2015 | Xie | H04B 1/3888 |
| | | | 455/575.8 |
| 2015/0133203 A1* | 5/2015 | Xie | H04M 1/185 |
| | | | 455/575.8 |
| 2015/0141091 A1* | 5/2015 | Oh | H04M 1/185 |
| | | | 455/575.8 |
| 2015/0381785 A1* | 12/2015 | Gander | A45F 5/00 |
| | | | 455/575.1 |
| 2017/0294935 A1* | 10/2017 | Jacobs | H04M 1/185 |

(Continued)

OTHER PUBLICATIONS

'myFlipShade Pineapple', https://mycharge.com/products/myflipshade-pineapple.

*Primary Examiner* — Luan K Bui

(57) ABSTRACT

A mobile device case with deployable privacy screens has a plurality of deployable privacy screens connected to the lateral wall of a mobile device case. The plurality of privacy screen member is connected to the lateral wall by a connecting member, which may serve as an elastic hinge or spring which keeps the privacy screen member in a deployed position, perpendicular to the display screen of the mobile device in order to block bystanders from viewing any personal information which may be displayed on the screen. The privacy screen members may be folded into a stored position, wherein a first attachment portion connected to the privacy screen member may be removably attached to a second attachment portion connected to a back of the mobile device case.

11 Claims, 4 Drawing Sheets

(56) References Cited

U.S. PATENT DOCUMENTS

2017/0322590 A1\* 11/2017 Jacobs .................. G06F 1/1603
2019/0072996 A1\* 3/2019 Pickens ................. G06F 1/1603
2019/0278337 A1\* 9/2019 Hu ........................ G06F 1/3206

\* cited by examiner

MOBILE DEVICE CASE WITH DEPLOYABLE PRIVACY SCREENS

FIELD OF THE INVENTION

The present invention relates generally to mobile phones. More particularly, the present invention relates to a case for mobile phones with deployable privacy screens.

BACKGROUND OF THE INVENTION

Privacy is the ability of an individual or group to seclude themselves, or information about themselves, and thereby express themselves selectively. The boundaries and content of what is considered private differ among cultures and individuals. In the course of a user's interaction their mobile device, such sensitive information may be displayed on the screen of the mobile device on occasion, which may be susceptible to observation by passersby or other individuals in the vicinity. Aside from particularly sensitive information, an individual may wish to prevent others nearby from observing the contents of their screen for the sake of privacy in general. In situations such as mass transit or public spaces, it is difficult to completely prevent others from observing one's activity on a mobile device. It is therefore an objective of the present invention to present a case for mobile devices with integrated, privacy screens which can be deployed in order to physically block lines of sight other than the immediate user's to the screen of the mobile device.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is a case for mobile phones and other mobile devices with integrated, deployable privacy screens. The present invention may be attached to a mobile phone and deployed into position in order to occlude any lines of sight of people nearby, preventing inadvertent disclosure of private information being displayed on the mobile device.

Figure 1:
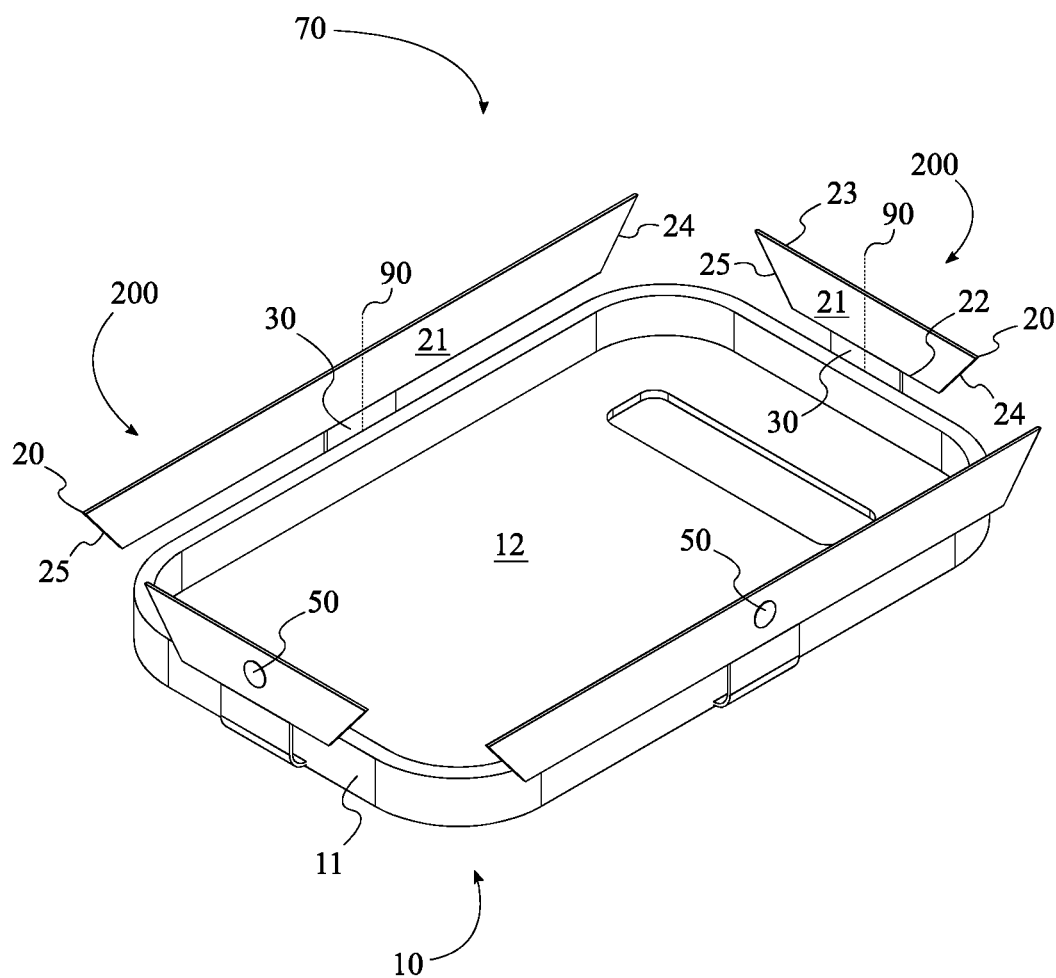
FIG. 1 is a raised perspective view of the present invention.
Figure 2:
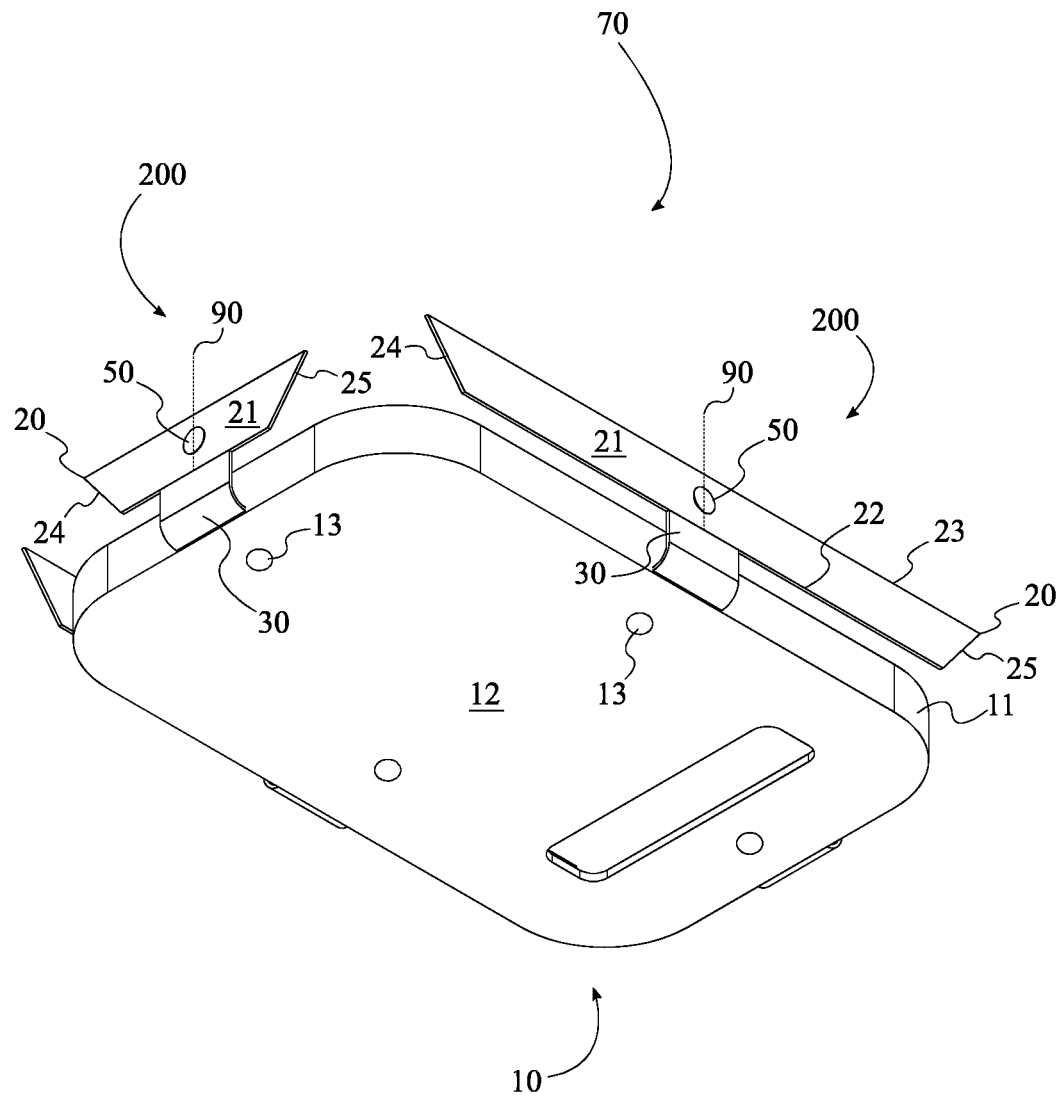
FIG. 2 is a lowered perspective view of the present invention.

Referring to FIGS. 1-2, in general, the present invention comprises a mobile device case 10 and a plurality of deployable privacy screens 200. The mobile device case 10 comprises a lateral wall 11, a back 12, and a plurality of first attachment portions 13. The lateral wall 11 is terminally and perimetrically connected to the back 12 as is typical with mobile device cases.

Each of the plurality of deployable privacy screens 200 is laterally connected to the mobile device case 10, more particularly to the lateral wall 11 in some embodiments. In the preferred embodiment of the present invention, the plurality of deployable privacy screens 200 comprises four deployable privacy screens, wherein the mobile device case 10 is rectangular in shape with four sides, and each of the four deployable privacy screens is positioned centrally on one of the four sides of the mobile device case 10. In the preferred embodiment, each of the plurality of deployable privacy screens 200 comprises a privacy screen member 20, a connecting member 30, and a second attachment portion 50.

The privacy screen member 20 may vary in different embodiments, but generally is an elongated, flat strip of material. The privacy screen member 20 may be constructed of any desirable material, such as, but not limited to, plastic, metal, wood, or other suitable materials. Furthermore, in the preferred embodiment of the present invention, the privacy screen member 20 is constructed of optically occlusive material. When in use, the privacy screen member 20 projects upward from the edge of the lateral wall 11 of the mobile device case 10, preventing prying eyes from observing the screen of a mobile device contained within the mobile device case 10 of the present invention.

In the preferred embodiment, the privacy screen member 20 comprises a body 21, a proximal edge 22, a distal edge 23, a first lateral edge 24, and a second lateral edge 25. The body 21 is the main structure of the privacy screen member 20 and is delineated by the proximal edge 22, the distal edge 23, the first lateral edge 24, and the second lateral pedge 25. The proximal edge 22 and the distal edge 23 are positioned opposite each other along the body 21, and in some embodiments, are oriented parallel to each other. The first lateral edge 24 and the second lateral edge 25 are similarly positioned opposite each other along the body 21 and are connected between the proximal edge 22 and the distal edge 23. Furthermore, in the preferred embodiment, the privacy screen member 20 is laterally symmetrical with the first lateral edge 24 and the second lateral edge 25 being symmetrical about a central axis 90, though this may not be a requirement in all embodiments.

The connecting member 30 is terminally connected between the lateral wall 11 of the mobile device case 10 and the privacy screen member 20, and generally serves to traverse from the lateral wall 11 of the mobile device case 10 to a position adjacent to the top face, or display screen, of the mobile device, where the connecting member 30 supports the privacy screen member 20 in place in order to block surrounding lines of sight to the display screen. In some embodiments, the connecting member 30 may also be symmetrical about the central axis 90. Furthermore, in the preferred embodiment, the connecting member 30 is constructed from a flexible material in order to facilitate the hinging action of the privacy screen member 20 relative to the back 12.

Figure 3:
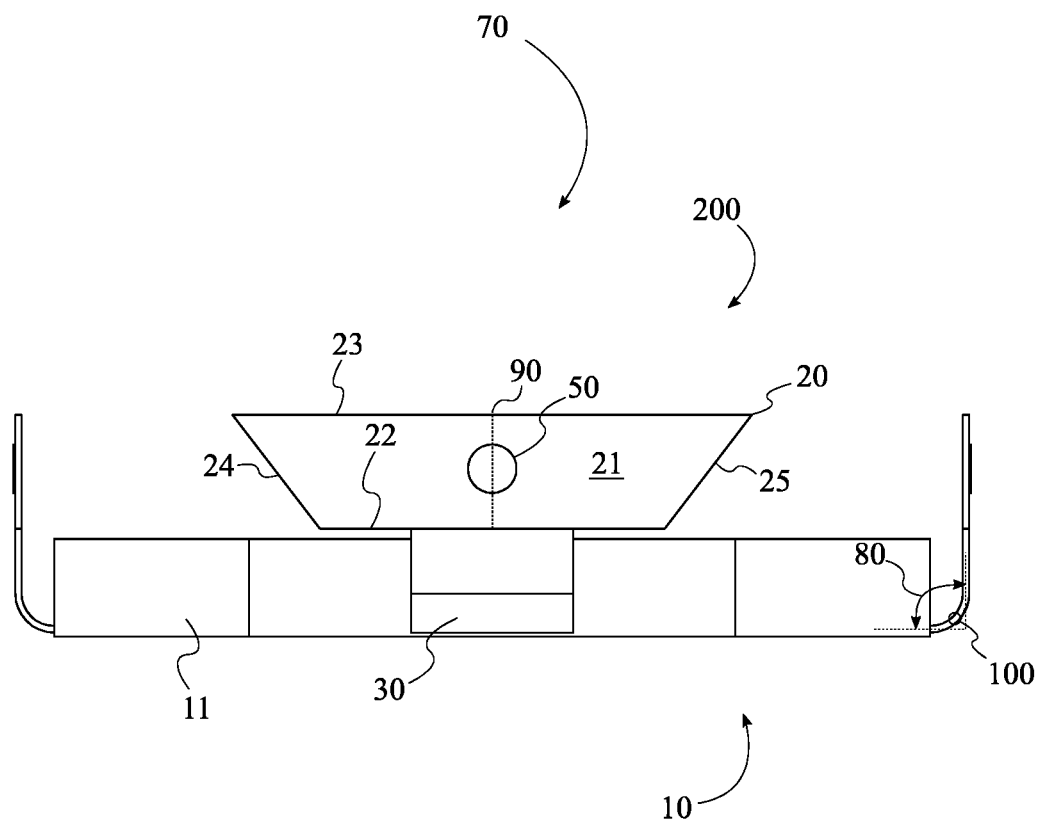
FIG. 3 is a side view of the present invention.
Figure 4:
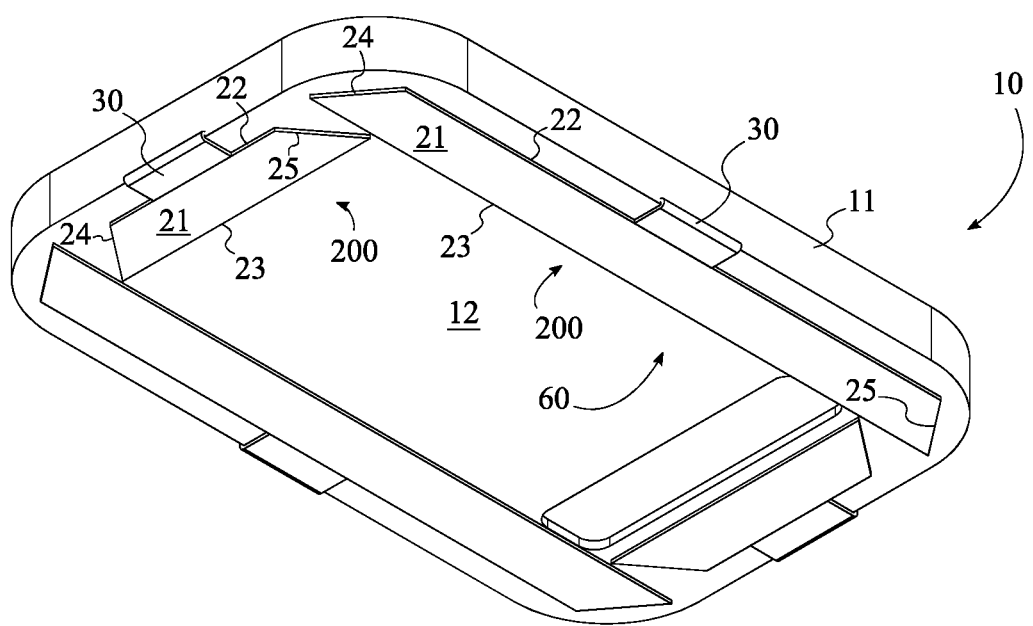
FIG. 4 is a lowered perspective of the present invention with the privacy screens in the stored position.

Furthermore, the privacy screen member 20 is hingedly connected to the lateral wall 11 of the mobile device case 10 through the connecting member 30, such that the plane of rotation of the privacy screen member 20 is aligned with the central axis 90. The privacy screen member 20 is configured to rotate relative to the lateral wall 11 between a stored position 60 and a deployed position 70, as shown in FIGS. 3-4, wherein the privacy screen member 20 is oriented at a specified angle 80 to the back 12 in the deployed position 70. In some embodiments, the privacy screen member 20 is oriented perpendicular to the back 12 in the deployed position 70, such that the specified angle 80 is 90 degrees, though the specified angle 80 may vary in other embodiments, or may be established within a desired angular range. The specified angle 80 or desired angular range may be enabled through any suitable means, such as, but not limited to, the specific geometries of either the connecting member 30, privacy screen member 20, or both, or by a spring 100 being integrated into the connecting member 30 or between the connecting member 30 and the privacy screen member 20 as shown in FIG. 3, the spring 100 being configured to apply a moment to the privacy screen member 20 in order to displace the privacy screen member 20 toward the deployed position 70. More particularly, in embodiments incorporating a spring 100, the spring 100 is operatively connected between the lateral wall 11 and the privacy screen member 20 such that the spring 100 is configured to maintain the privacy screen member 20 in the deployed position 70. In some embodiments, the spring 100 may be incorporated into the present invention as a separate components. In some embodiments, the spring 100 may simply be constructed through the geometry and material properties of the connecting member 30. Regardless, the spring 100 is constructed of an elastically flexible material. It is contemplated that an angular stopping means may be comprised in some embodiments in order to stop the rotation of the privacy screen member 20 beyond the specified angle 80.

In the preferred embodiment of the present invention, the first lateral edge 24 and the second lateral edge 25 are each tapered inward from the distal edge 23 to the proximal edge 22. This is to ensure that the privacy screen members 10 do not overlap each other.

The plurality of first attachment portions 13 and the second attachment portion 50 of the plurality of deployable privacy screens 200 enable the privacy screen member 20 to be securely positioned into the stored position 60 (i.e. folded onto the back 12) when the present invention is not in use, as shown in FIG. 4. In the preferred embodiment of the present invention, the first attachment portions 13 and the second attachment portion 50 are each a magnet, providing a quick and easy means to secure the privacy screen member 20 into the stored position 60. Alternatively, either the first attachment portions 13 or the second attachment portions 50 is a magnet, while the other of the first or second attachment portions is composed of a ferromagnetic material attracted to magnets. However, it is contemplated that in various embodiments, the nature of the first attachment portions 13 and the second attachment portions 50 may vary. For example, in various embodiments, the first attachment portions 13 and the second attachment portions 50 may comprise various fastening means, such as, but not limited to, portions of hook and loop tape, button snaps, latches, or other mechanical fasteners or fastening means.

Although the invention has been explained in relation to its preferred embodiment, it is to be understood that many other possible modifications and variations can be made without departing from the spirit and scope of the invention as hereinafter claimed.

What is claimed is:

1. A mobile device case with deployable privacy screens for mobile devices comprises:
    a mobile device case comprising a lateral wall, a back and a plurality of first attachment portions;
    the lateral wall being terminally and perimetrically connected to the back;
    a plurality of deployable privacy screens;
    each of the plurality of deployable privacy screens being laterally connected to the mobile device case;
    each of the plurality of deployable privacy screens comprises a privacy screen member, a connecting member, and a second attachment portion;
    the privacy screen member comprises a body, a proximal edge, a distal edge, a first lateral edge, and a second lateral edge;
    the body being delineated by the proximal edge, the distal edge, the first lateral edge, and the second lateral edge;
    the privacy screen member being constructed of optically occlusive material;
    the connecting member being terminally connected between the lateral wall of the mobile device case and the privacy screen member;
    the privacy screen member being hingedly connected to the lateral wall through the connecting member;
    the privacy screen member being configured to rotate relative to the lateral wall between a stored position and a deployed position, wherein the privacy screen member is oriented at a specified angle to the back in the deployed position;
    each of the plurality of first attachment portions being connected to the back opposite the lateral wall;
    the second attachment portion being connected to the body of the privacy screen member; and
    the second attachment member being removably attached to one of the plurality of first attachment members, wherein the first attachment member and the second attachment member are attached to each other in the stored position.

2. The mobile device case with deployable privacy screens as claimed in claim 1 comprises:
    the privacy screen member being oriented perpendicular to the back in the deployed position, wherein the specified angle is 90 degrees.

3. The mobile device case with deployable privacy screens as claimed in claim 1 comprises:
    the privacy screen member being laterally symmetrical, wherein the first lateral edge and the second lateral edge are symmetrical about a central axis.

4. The mobile device case with deployable privacy screens as claimed in claim 1 comprises:
    the proximal edge and the distal edge being positioned opposite each other along the body;
    the first lateral edge and the second lateral edge being positioned opposite each other along the body; and
    the first lateral edge and the second lateral edge being connected between the proximal edge and the distal edge.

5. The mobile device case with deployable privacy screens as claimed in claim 1, wherein the connecting member is constructed from a flexible material.

6. The mobile device case with deployable privacy screens as claimed in claim 1 comprises:
   a spring; and
   the spring being operatively connected between the lateral wall and the privacy screen member, wherein the spring is configured to maintain the privacy screen member in the deployed position.

7. The mobile device case with deployable privacy screens as claimed in claim 6 comprises:
   the spring being integrated into the connecting member.

8. The mobile device case with deployable privacy screens as claimed in claim 6 comprises:
   the spring being constructed of an elastically flexible material.

9. The mobile device case with deployable privacy screens as claimed in claim 1 comprises:
   the connecting member being terminally connected between the lateral wall and the privacy screen member.

10. The mobile device case with deployable privacy screens as claimed in claim 1 comprises:
    the first lateral edge and the second lateral edge being tapered inward from the distal edge to the proximal edge.

11. The mobile device case with deployable privacy screens as claimed in claim 1 comprises:
    the first attachment portion and the second attachment portion each being a magnet.

\* \* \* \* \*